US012686116B2

(12) United States Patent
Takeda

(10) Patent No.: US 12,686,116 B2
(45) Date of Patent: Jul. 21, 2026

(54) CONVEYANCE DEVICE

(71) Applicant: AIDA ENGINEERING, LTD.,
Kanagawa (JP)

(72) Inventor: Keisuke Takeda, Sagamihara (JP)

(73) Assignee: AIDA ENGINEERING, LTD.,
Kanagawa (JP)

( * ) Notice: Subject to any disclaimer, the term of this
patent is extended or adjusted under 35
U.S.C. 154(b) by 0 days.

(21) Appl. No.: 18/741,374

(22) Filed: Jun. 12, 2024

(65) Prior Publication Data

US 2024/0416505 A1 Dec. 19, 2024

(30) Foreign Application Priority Data

Jun. 19, 2023 (JP) ................................. 2023-099997

(51) Int. Cl.
*B25J 9/10* (2006.01)
*B25J 19/00* (2006.01)
(52) U.S. Cl.
CPC .......... *B25J 9/102* (2013.01); *B25J 19/0029*
(2013.01); *B25J 19/0062* (2013.01)
(58) Field of Classification Search
CPC ................................. B25J 9/126; B25J 9/102
See application file for complete search history.

(56) References Cited

U.S. PATENT DOCUMENTS

| | | |
|---|---|---|
| 12,115,656 B1 | 10/2024 | Tolson et al. |
| 2007/0232433 A1 | 10/2007 | Haga et al. |

| | | |
|---|---|---|
| 2009/0019961 A1 | 1/2009 | Kobayashi |
| 2009/0233750 A1 | 9/2009 | Nakamura |
| 2018/0071912 A1 | 3/2018 | Rouaud et al. |
| 2021/0154830 A1 | 5/2021 | Lee et al. |
| 2022/0099162 A1 | 3/2022 | Hirose et al. |
| 2022/0349463 A1 | 11/2022 | Kito et al. |
| 2024/0416505 A1 | 12/2024 | Takeda |

FOREIGN PATENT DOCUMENTS

| | | | | |
|---|---|---|---|---|
| CN | 107520836 A | * 12/2017 | .............. | B25J 9/003 |
| CN | 110662633 B | 1/2020 | | |
| CN | 111923062 A | * 11/2020 | ........... | B22D 43/005 |

(Continued)

OTHER PUBLICATIONS

Machine translation of CN 107520836 (Year: 2017).*

(Continued)

*Primary Examiner* — Randell J Krug
(74) *Attorney, Agent, or Firm* — Rimon P.C.

(57) ABSTRACT

A conveyance device includes a fixed base having a large
gear, a turning body supported by the fixed base via a
bearing, two or more servomotors, a conveyance arm, and
two or more speed reducers. The speed reducer includes a
housing integrated with the turning body, a planetary carrier
rotatably supported inside the housing, an internal gear
provided inside the housing, a sun gear connected to an
output shaft of the servomotor, a plurality of planetary gears
arranged around the sun gear and rotatably supported by the
planetary carrier, and an output gear rotating integrally with
the planetary carrier. The planetary gear meshes with the sun
gear and meshes with the internal gear. The output gear has
a smaller diameter than that of the large gear and meshes
with the large gear outside the large gear.

6 Claims, 5 Drawing Sheets

(56)  References Cited

FOREIGN PATENT DOCUMENTS

| | | | | | |
|---|---|---|---|---|---|
| CN | 115446805 | A | * | 12/2022 | |
| DE | 102015006311 | B4 | * | 2/2023 | ............ F16H 57/04 |
| JP | 2007-085530 | A | | 4/2007 | |
| JP | 2010-023195 | A | | 2/2010 | |
| JP | 2011-212839 | A | | 10/2011 | |
| JP | 2012-011418 | A | | 1/2012 | |
| JP | 2018-202545 | A | | 12/2018 | |
| JP | 2020-148324 | A | | 9/2020 | |
| JP | 2022-054866 | A | | 4/2022 | |
| JP | 2022-170482 | A | | 11/2022 | |

OTHER PUBLICATIONS

Machine translation of CN 111923062 (Year: 2020).*
Machine translation of CN 115446805 (Year: 2022).*
Machine translation of DE 102015006311 (Year: 2023).*
Extended European Search Report dated Nov. 4, 2024, issued in corresponding European Patent Application No. 24182761.7, 7 pages.
Extended European Search Report dated Apr. 20, 2026, issued in corresponding European Patent Application No. 25221217.0.
Japanese Office Action dispatched on Mar. 31, 2026, issued in the corresponding Japanese Patent Application No. 2023-099997.
Notice of Allowance issued in related U.S. Appl. No. 19/402,367, dated Apr. 15, 2026.

* cited by examiner

CONVEYANCE DEVICE

CROSS-REFERENCE TO RELATED APPLICATION

Japanese Patent Application No. 2023-099997, filed on Jun. 19, 2023, is hereby incorporated by reference in their entirety.

BACKGROUND OF THE INVENTION

Field of the Invention

The present invention relates to a conveyance device that conveys a workpiece using a conveyance arm.

Description of Related Art

Conventionally, in a conveyance device that turns a conveyance arm, an eccentric oscillating speed reducer is often adopted as a drive mechanism for turning the conveyance arm (for example, JP-A-2011-212839). Such an eccentric oscillating speed reducer has a small backlash and, as such, there is an advantage in that position accuracy in conveying is excellent when the eccentric oscillating speed reducer is adopted in the conveyance device.

Further, a speed reducer using a planetary gear for a drive mechanism such as a joint of a robot is also known (for example, JP-A-2018-202545).

However, when it is assumed that an industrial robot including the eccentric oscillating speed reducer as disclosed in JP-A-2011-212839 is used as, for example, a conveyance device for carrying a workpiece from a stacker on which workpieces for press working are stacked into a press machine, a conveyance device for carrying a workpiece worked by a press machine from the press machine to a stacker, or a conveyance device for conveying a workpiece from one press machine to the other press machine among a plurality of press machines, it is necessary to move the conveyance arm in a reciprocating (oscillatable) manner at a higher speed in a limited region (space) in order to improve production efficiency. Therefore, when the conveyance arm is turned faster, the speed reducer is heated at the inside and its components expand, which causes a problem that the speedup is limited.

Furthermore, in the speed reducer disclosed in JP-A-2018-202545, heat generation is suppressed even when the conveyance arm is moved at a higher speed in the reciprocating manner. However, in order to increase output torque of a motor so as to turn the arm at a high speed by an inexpensive and lightweight motor, it is necessary to increase a speed reduction ratio by connecting gears to each other in a multi-stage layout. The multi-stage connection of the gears in this case entails an increase in a distance from a turning shaft of the conveyance arm to a position of the center of gravity of the motor. That is, the moment of inertia of a turning portion itself of the conveyance device increases. This increase in moment of inertia limits an increase in acceleration or deceleration of the conveyance arm that is continuously moved in a reciprocating manner within a limited region, which finally hinders continuously conveying workpiece at a high speed.

SUMMARY OF THE INVENTION

The present disclosure provides a conveyance device capable of easily securing a large speed reduction ratio of a speed reducer and allowing for a high speed in moving a conveyance arm that repeatedly oscillates.

According to a first aspect of the disclosure, there is provided a conveyance device including:

a fixed base including a large gear serving as an external gear;

a turning body supported by the fixed base via a bearing;

two or more servomotors configured to rotate the turning body relative to the fixed base;

a conveyance arm configured to be able to convey a workpiece by turning in conjunction with the turning body; and two or more speed reducers fixed to the turning body and respectively connected to the two or more servomotors, wherein:

the speed reducer includes a housing integrated with the turning body, a planetary carrier rotatably supported inside the housing, an internal gear provided inside the housing, a sun gear connected to an output shaft of the servomotor, a plurality of planetary gears arranged around the sun gear and rotatably supported by the planetary carrier, and an output gear configured to rotate integrally with the planetary carrier;

the planetary gear meshes with the sun gear and with the internal gear; and the output gear has a smaller diameter than a diameter of the large gear and meshes with the large gear outside the large gear.

DESCRIPTION OF THE INVENTION

Figure 1:
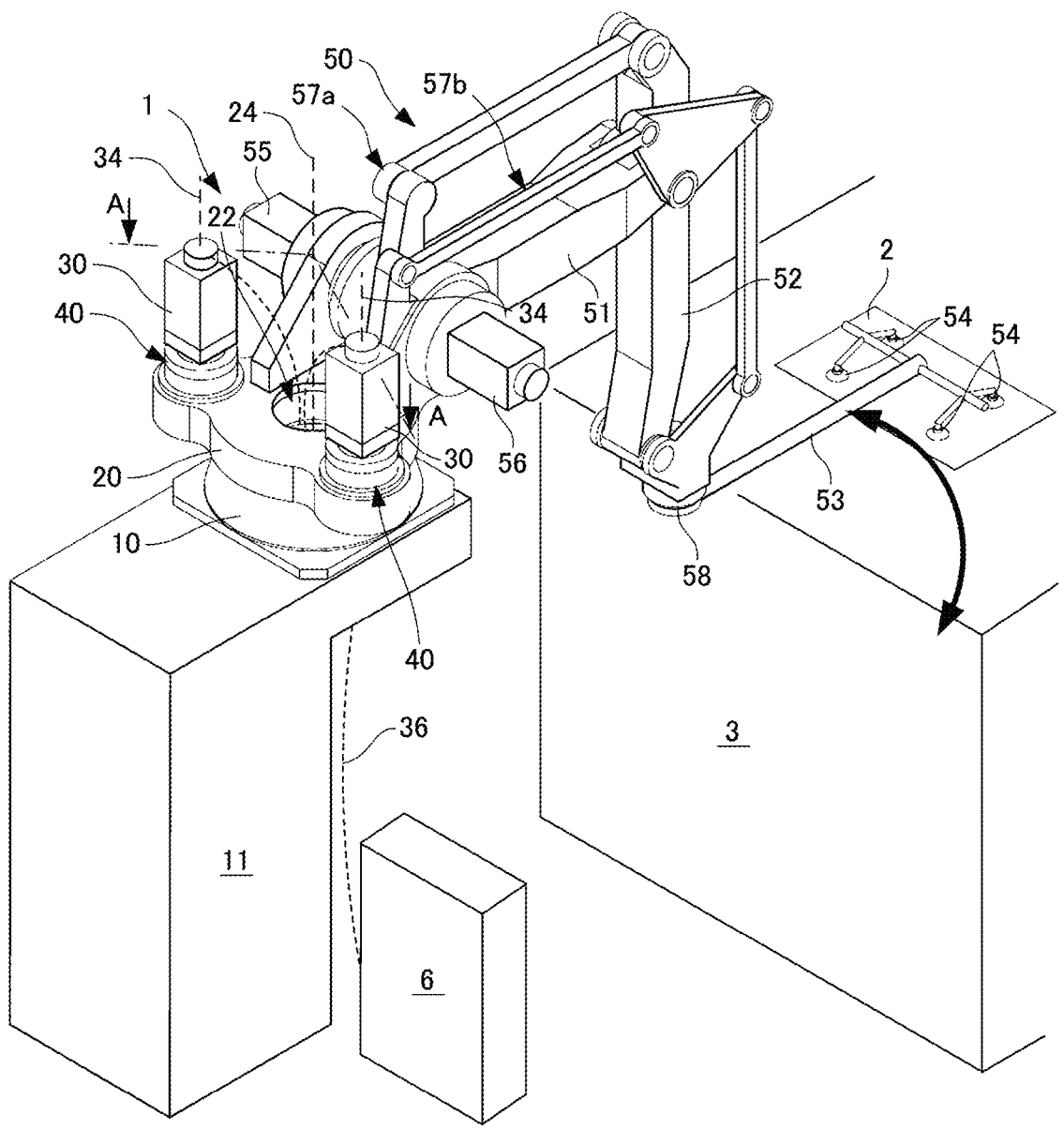
FIG. 1 is a perspective view of a conveyance device according to the present embodiment.

The present disclosure has been made to solve at least a part of the above-described problems and can be implemented as the following aspects or application examples.

[1] One aspect of a conveyance device according to the present disclosure includes:

a fixed base including a large gear serving as an external gear;

a turning body supported by the fixed base via a bearing;

two or more servomotors configured to rotate the turning body relative to the fixed base;

a conveyance arm configured to be able to convey a workpiece by turning in conjunction with the turning body; and two or more speed reducers fixed to the turning body and respectively connected to the two or more servomotors, in which:

the speed reducer includes a housing integrated with the turning body, a planetary carrier rotatably supported inside the housing, an internal gear provided inside the housing, a sun gear connected to an output shaft of the servomotor, a plurality of planetary gears arranged around the sun gear and rotatably supported by the planetary carrier, and an output gear configured to rotate integrally with the planetary carrier, the planetary gear meshes with the sun gear and with the internal gear, and the output gear has a smaller diameter than a diameter of the large gear and meshes with the large gear outside the large gear.

According to one aspect of the conveyance device, using the planetary gear, and not an eccentric oscillating speed reducer that is easily heated as in JP-A-2011-212839 makes it possible to turn the turning body and the conveyance arm at a higher speed while suppressing heat generation. Further, according to one aspect of the conveyance device, disposing the two or more speed reducers using the planetary gears around the large gear serving as the external gear makes it possible to easily secure a high speed reduction ratio.

[2] In one aspect of the conveyance device, the fixed base may have an annular end portion having an annular shape and protruding from the fixed base, the large gear having an annular shape may be fixed to an outer peripheral surface of the annular end portion, and an outer ring of the bearing fixed to an inner peripheral surface of the annular end portion, the turning body may include an annular fixing portion having an annular shape and disposed along an inner side of the annular end portion, an inner ring of the bearing may be fixed to an outer peripheral surface of the annular fixing portion, the fixed base and the turning body may jointly have an opening formed inside the annular fixing portion along a rotation axis of the turning body, and a wiring may extend from the fixed base to the servomotor so as to pass through the opening.

According to one aspect of the conveyance device, the opening can be provided inside the large gear, which enables wiring using the opening. Further, according to one aspect of the conveyance device, a large opening matching the large gear can be provided, which makes it possible to adopt a large servomotor requiring a thick power line.

[3] In one aspect of the conveyance device, the conveyance arm may include a first arm and a first drive mechanism, the first arm having one end rotatably connected to the turning body, and the first drive mechanism may be configured to turn the first arm upwards and downwards so as to raise and lower the other end of the first arm.

According to one aspect of the conveyance device, the first drive mechanism can move the other end of the first arm upwards and downwards.

[4] In one aspect of the conveyance device, the wiring passing through the opening may include a power line connected to the first drive mechanism.

According to one aspect of the conveyance device, the power line of the first drive mechanism can be wired using the opening.

[5] In one aspect of the conveyance device, a seal member may be provided between an outer peripheral surface of the planetary carrier and an inner peripheral surface of the housing, and lubricating oil may be sealed in the housing by the seal member.

According to one aspect of the conveyance device, an amount of oil used in a planetary speed-reduction mechanism can be reduced.

[6] In one aspect of the conveyance device, the workpiece may be a metal plate for press working or a product after the press working.

According to one aspect of the conveyance device, even when a metal workpiece is conveyed, the conveyance of the workpiece can be speeded up.

Hereinafter, preferred embodiments of the present disclosure are described in detail with reference to the drawings. It is noted that the embodiments described below do not unreasonably limit the contents of the present disclosure described in the claims. In addition, not all the configurations described below are essential configurations of the present disclosure.

1. Overview of Conveyance Device

FIG. 1 is a perspective view of a conveyance device 1 according to the present embodiment. The conveyance device 1 includes a fixed base 10, a turning body 20 rotatable relative to the fixed base 10, two or more servomotors 30, a conveyance arm 50 turning in conjunction with the turning body 20, and two or more speed reducers 40 respectively connected to the two or more servomotors 30. The conveyance device 1 may include a control device 6 that controls a motion of the conveyance device 1.

The fixed base 10 is fixed on a machine base 11. In the present embodiment, an example with two servomotors 30 is described, but the present invention is not limited thereto, and there may be three or more servomotors. The two servomotors 30 can rotate the turning body 20 relative to the fixed base 10.

The conveyance arm 50 is configured to be able to convey a workpiece 2 by turning in conjunction with the turning body 20. The conveyance arm 50 is fixed to the turning body 20. The conveyance device 1 can be a so-called articulated robot, for example, a four-axis robot. The conveyance arm 50 includes a plurality of long members, for example, a first arm 51, a second arm 52, and a long member 53. The conveyance arm 50 can include a first drive mechanism 55, a second drive mechanism 56, and a third drive mechanism 58, each including, for example, a servomotor. The conveyance arm 50 can further include a first lever set 57a and a second lever set 57b, each formed of a link mechanism. One end of the first arm 51 is rotatably connected to the turning body 20, and the first arm 51 is turned up and down by the first drive mechanism 55 to raise and lower the other end thereof. The second arm 52 is rotatably connected to the other end of the first arm 51. The first lever set 57a is connected to one end of the second arm 52 and is moved by the second drive mechanism 56. The other end of the second arm 52 is moved forwards and rearwards relative to the turning body 20 by moving the first lever set 57a by the second drive mechanism 56. The third drive mechanism 58 is fixed to the other end of the second arm 52 via the second lever set 57b, and moves upwards and downwards while maintaining a horizontal state even when the first arm 51 moves upwards and downwards. One end of the long member 53 is rotatably connected to the third drive mechanism 58, and the other end (free end of the conveyance arm 50) thereof has a plurality of suction members 54 for holding the workpiece 2. The long member 53 rotates the workpiece 2 horizontally relative to the other end of the second arm 52 by driving the third drive mechanism 58. It is noted that the conveyance arm 50 can appropriately adopt any known structure of conveyance arm in an articulated robot. Further, the layout of the suction member 54 is not limited to the suction mechanism as long as it can hold the workpiece 2, and may be, for example, a gripping mechanism.

The conveyance device 1 is disposed, for example, adjacent to a press machine 3. Further, for example, the conveyance device 1 may be disposed between a plurality of press machines 3 and may be configured to convey a workpiece from an upstream press machine to a downstream press machine. The workpiece 2 can be a metal plate for press working or a product after press working. The conveyance device 1 conveys the workpiece 2 on the press machine 3 by driving the servomotor 30 to horizontally turn the turning body 20 and the conveyance arm 50 around a first rotation axis 24. In this conveying motion, for example, the first arm 51 is turned by the first drive mechanism 55 to raise and lower the workpiece 2, the second arm 52 is turned by the second drive mechanism 56 to move the workpiece 2 forwards and rearwards, and the long member 53 is turned by the third drive mechanism 58 to horizontally turn the workpiece 2, thereby conveying the workpiece 2 to an appropriate position. A pressed product tends to be heavy, and press working needs to improve productivity. In the conveyance device 1, a higher speed can be achieved in conveying the workpiece 2, even when the metallic workpiece 2 used for press working should be conveyed. In the present embodiment, an example of conveying the workpiece 2 toward the press machine 3 will be described, but the workpiece 2 may be disposed adjacent to a device other than the press machine 3. For example, in the case of a machine tool, the workpiece 2 can be a workpiece or a material after cutting, and in the case of an injection molding machine, the workpiece 2 can be a plastic product or an insert material.

The control device 6 is electrically connected to each operation unit of the conveyance device 1. The control device 6 may receive a signal from a sensor (not illustrated) of the conveyance device 1. Further, the control device 6 may be a part of the control device of the press machine 3. The control device 6 includes, for example, a manipulation unit, a calculation unit, a storage unit, a display unit, and an output unit. The control device 6 includes, for example, a processor such as a central processing unit (CPU) or a graphics processing unit (GPU), a storage medium such as a read only memory (ROM), a random access memory (RAM), or a hard disk drive (HDD), a communication interface that performs high-speed data communication, and a user interface such as a display, a touch panel, or a keyboard. A part or all of the control device 6 may be provided on a cloud via the Internet.

The conveying motion in the conveyance device 1 can be set in advance using the manipulation unit. The display unit can display a setting content and an execution status of the conveying motion. The calculation unit executes each processing for executing the set conveying motion. Then, the conveyance device 1 can operate according to the conveying motion stored in the storage unit in response to a command signal from the output unit of the control device 6.

2. Description of Speed-Reduction Mechanism

Figure 2:
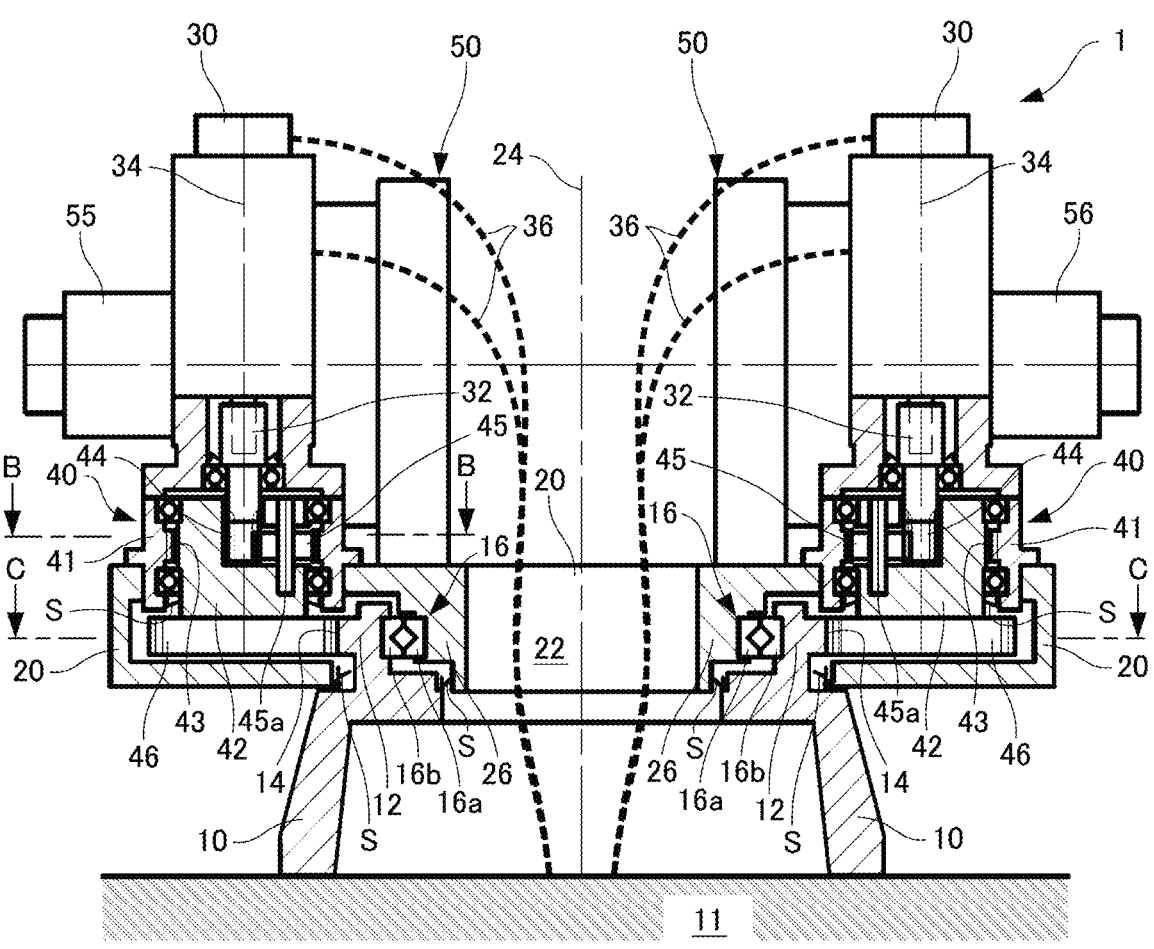
FIG. 2 is a cross-sectional view taken along line A-A in FIG. 1.
Figure 3:
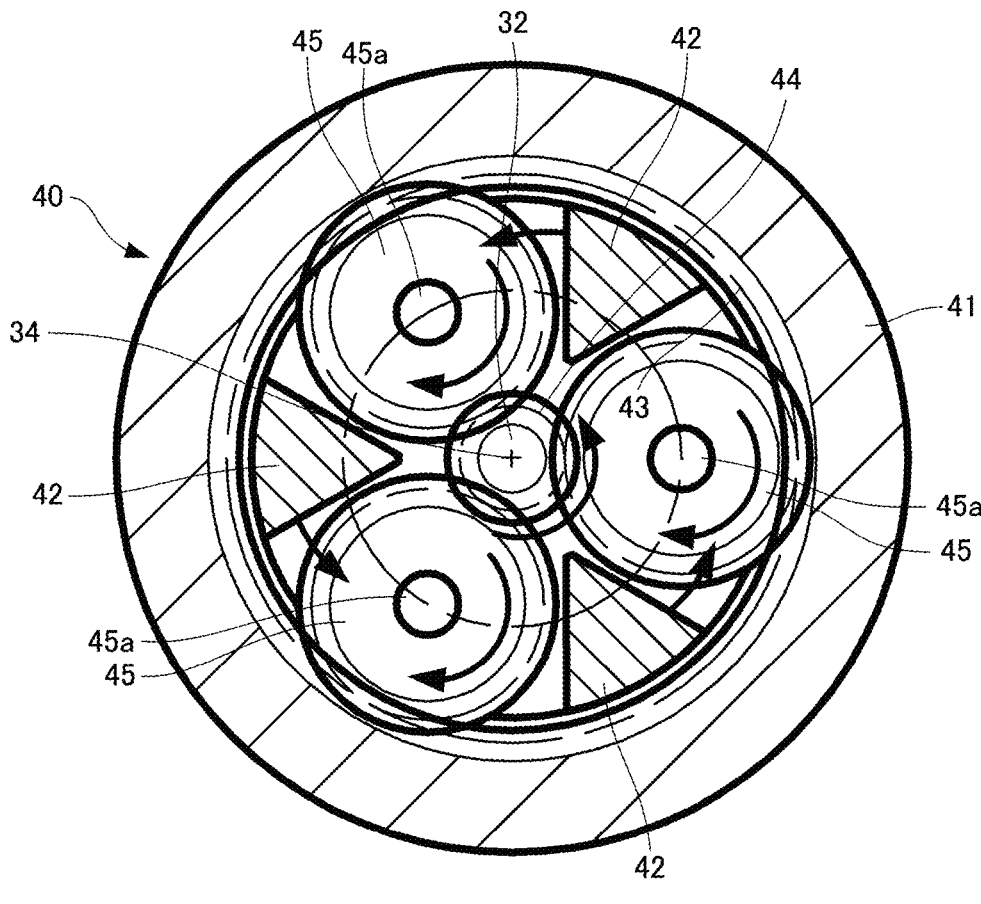
FIG. 3 is a cross-sectional view taken along line B-B in FIG. 2.
Figure 4:
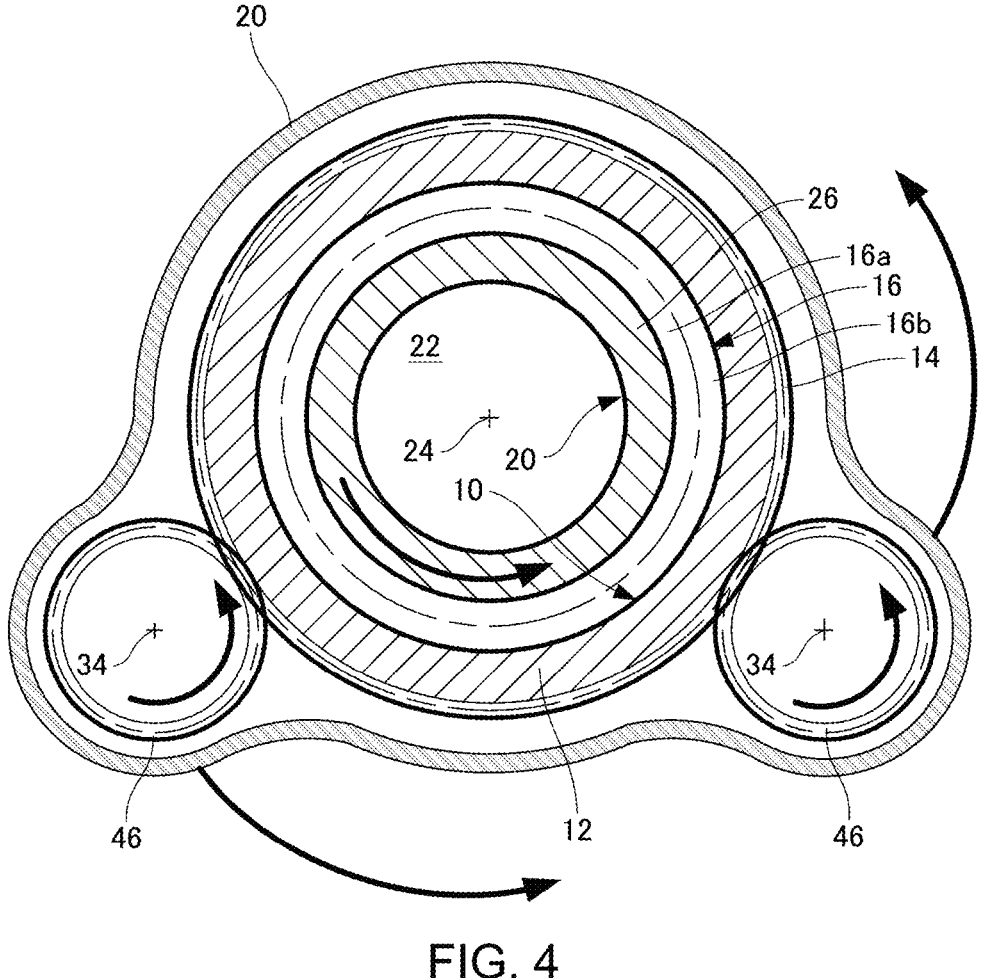
FIG. 4 is a cross-sectional view taken along line C-C in FIG. 2.

A speed-reduction mechanism of the conveyance device 1 will be described in detail with reference to FIGS. 2 to 4. FIG. 2 is a cross-sectional view taken along line A-A in FIG. 1, FIG. 3 is a cross-sectional view taken along line B-B in FIG. 2, and FIG. 4 is a cross-sectional view taken along line C-C in FIG. 2.

The conveyance device 1 includes the fixed base 10 having a large gear 14 serving as an external gear, and the turning body 20 supported by the fixed base 10 via a bearing 16. The conveyance device 1 further includes two or more servomotors 30 fixed to the turning body 20 via the speed reducer 40, the conveyance arm 50 having a fixed end fixed to the turning body 20, and two or more speed reducers 40 each fixed to the turning body 20.

The fixed base 10 is disposed on the machine base 11 and turnably supports the turning body 20 and the conveyance arm 50. The fixed base 10 has, for example, an annular end portion 12 protruding from the fixed base 10. The fixed base 10 can have a hollow cylindrical shape, and the annular end portion 12 is formed at the upper end of the cylinder being the fixed base 10. In the annular end portion 12, the annular large gear 14 is fixed to the outer peripheral surface of the annular end portion 12, and an outer ring 16b of the bearing 16 is fixed to the inner peripheral surface of the annular end portion 12.

The bearing 16 is a rolling bearing including the outer ring 16b fixed to the fixed base 10, an inner ring 16a fixed to the turning body 20, and a ball or a roller between the outer ring 16b and the inner ring 16a. The bearing 16 is disposed, for example, in one horizontal plane. The bearing 16 is, for example, a cross roller bearing.

The turning body 20 is a member integrated with the conveyance arm 50 that covers the annular end portion 12 so as to straddle from the inside of the annular end portion 12 to the outside thereof. A base end of the conveyance arm 50 is fixed to the upper surface of the turning body 20. When the turning body 20 rotates around the first rotation axis 24 relative to the fixed base 10 by driving the servomotor 30, the conveyance arm 50 and the workpiece 2 can be turned around the first rotation axis 24. The first rotation axis 24 is an imaginary line that becomes a rotation center of the turning body 20 and is indicated by an alternate long and short dash line in the drawing. The turning body 20 has an annular fixing portion 26 disposed along the inside of the annular end portion 12. The inner ring 16a of the bearing 16 is fixed to the outer peripheral surface of the annular fixing portion 26. The annular fixing portion 26 is provided with an annular seal member S between the annular fixing portion 26 and the fixed base 10 below a portion to which the inner ring 16a is fixed.

In both of the fixed base 10 and the turning body 20, an opening 22 is formed along the first rotation axis 24 of the turning body 20 inside the annular fixing portion 26. The conveyance device 1 may be configured such that a wiring 36 extends from the fixed base 10 to the servomotor 30 so as to pass through the opening 22. In the conveyance device 1, the opening 22 can be provided inside the large gear 14, which enables wiring using the opening 22. Further, in the conveyance device 1, the large opening 22 matching large gear 14 can be provided, which makes it possible to adopt the large servomotor 30 that requires a thick power line. The wiring 36 may include a power line or the like to the first drive mechanism 55 or the like other than the servomotor 30, or may include a signal line or the like to a sensor (not illustrated). In addition, the wiring 36 may extend below the fixed base 10 and may be connected to the control device 6.

The speed reducer 40 includes a housing 41, a planetary carrier 42, an internal gear 43, a sun gear 44, a plurality of planetary gears 45, and an output gear 46.

The housing 41 is integrated with the turning body 20. The housing 41 has a substantially cylindrical shape that opens at its top and bottom, and has a lower end placed and fixed so as to extend up to the inside of the turning body 20; then the servomotor 30 is placed on its upper end and fixed to the upper end.

The planetary carrier 42 is rotatably supported inside the housing 41. The planetary carrier 42 has a substantially cylindrical shape and is attached to the housing 41 via bearings disposed at two positions at the top and bottom on the outer periphery of the planetary carrier 42. The output gear 46 is integrally fixed to the lower end of the planetary carrier 42. The rotation axis of an output shaft 32 is a second rotation axis 34. Therefore, when the planetary carrier 42 rotates around the second rotation axis 34, the output gear 46 thus rotates around the second rotation axis 34. It is noted that the second rotation axis 34 is, for example, an imaginary line parallel to the first rotation axis 24 extending in the vertical direction, and is indicated by an alternate long and short dash line in the drawing. The seal member S having an annular shape is provided between the lower end inner peripheral surface (below the bearing) of the housing 41 and the outer peripheral surface of the planetary carrier 42. The seal member S is an oil seal, and the seal member S can seal lubricating oil in the narrow housing 41 so as to minimize an amount of oil used in the planetary speed-reduction mechanism.

The internal gear 43 is provided inside the housing 41. The internal gear 43 is formed integrally with the inner peripheral surface of the cylindrical housing 41, surrounding the planetary carrier 42. The internal gear 43 is formed in a plane orthogonal to the second rotation axis 34, here, one horizontal plane.

The sun gear 44 is connected to the output shaft 32 of the servomotor 30. The sun gear 44 is provided on the outer periphery of the lower end of a rod connected to the output shaft 32. The rod extends from the output shaft 32 to the inside of the planetary carrier 42 along the second rotation axis 34. The sun gear 44 is an external gear and transmits rotation of the output shaft 32 to the speed reducer 40.

A plurality of planetary gears 45 are disposed around the sun gear 44 and are rotatably supported by the planetary carrier 42. In the present embodiment, the number of the planetary gears 45 is three, but is not limited thereto, and may be four or more. A rotation shaft 45a of the planetary gear 45 is rotatably supported by the planetary carrier 42 at the top and bottom. Further, the rotation shaft 45a may be fixed to the planetary carrier 42 at the top and bottom, and the planetary gear 45 may be rotatable relative to the rotation shaft 45a. The rotation shaft 45a is parallel to the second rotation axis 34. The rotation shaft 45a is disposed around the second rotation axis 34 and is disposed such that a part of the planetary gear 45 protrudes outwards from the outer peripheral surface of the planetary carrier 42. Each planetary gear 45 meshes with the sun gear 44 on the center side of the planetary carrier 42 and with the internal gear 43 at a position protruding from the planetary carrier 42.

The output gear 46 rotates integrally with the planetary carrier 42. The output gear 46 has a smaller diameter than that of the large gear 14 and meshes with the large gear 14 outside the large gear 14. The output gear 46 is an external gear larger than the outer diameter of the planetary carrier 42. The outer side and the lower side of the output gear 46 are covered with the turning body 20.

Therefore, in the conveyance device 1, driving the servomotor 30 induces rotation of the output shaft 32 and the sun gear 44 and rotation of the three planetary gears 45 meshing with the sun gear 44, as illustrated in FIG. 3; further, since each of the planetary gears 45 meshes with the internal gear 43, each of the planetary gears 45 rolls along the internal gear 43 so as to rotate the planetary carrier 42 relative to the housing 41. As illustrated in FIG. 4, the output gear 46 rotates when the planetary carrier 42 rotates, thus the output gear 46 rotates around the large gear 14 while rolling, and the turning body 20 supporting the planetary carrier 42 rotates around the first rotation axis 24 relative to the fixed base 10.

In the conveyance device 1, by using the planetary gear 45 makes it possible to suppress heat generation of the speed reducer 40 even if the servomotor 30 turns the turning body 20 and the conveyance arm 50 at a higher speed. Further, in the conveyance device 1, disposing two or more speed reducers 40 around the fixed base 10 having the large gear 14 serving as an external gear makes it possible to suppress an increase in size of the entire device while ensuring a high speed reduction ratio. In the conveyance device 1, it is possible to respond to a higher speed required for the conveying motion of the workpiece 2 toward the press machine 3.

In the conveyance device 1, backlash is larger than that of the speed-reduction mechanism of JP-A-2011-212839, so that malfunction due to heat generation is less likely to occur even at a higher speed. Additionally, in the conveyance device 1, using the large gear 14 and the output gear 46 as an output shaft as compared with JP-A-2018-202545 using a planetary carrier for the same purpose makes it possible to obtain a high speed reduction ratio. Therefore, if the motor outputs are the same, the rotational angular acceleration of the turning body 20 can be easily increased, and the conveyance speed can be easily increased.

In the present embodiment, rotation center lines of all the gears used in the speed reducer 40 are parallel to the first rotation axis 24 of the turning body 20, but the present invention is not limited thereto, and may be configured not to be parallel thereto by a combination of known gears.

In addition, two or more servomotors 30 may be positionally controlled by the control device 6 so as to offset backlash. Since the backlash can be offset, the workpiece 2 can exhibit high stop position accuracy at its transfer position even at a higher speed. Specifically, although there is backlash between the large gear 14 and the two output gears 46, it is possible to offset the backlash at the time of acceleration by performing control so that large torque is generated in one output gear 46 and slight reverse torque is generated in the other output gear 46 at the time of acceleration, and it is possible to offset the backlash at the time of deceleration by performing the reverse control.

Figure 5:
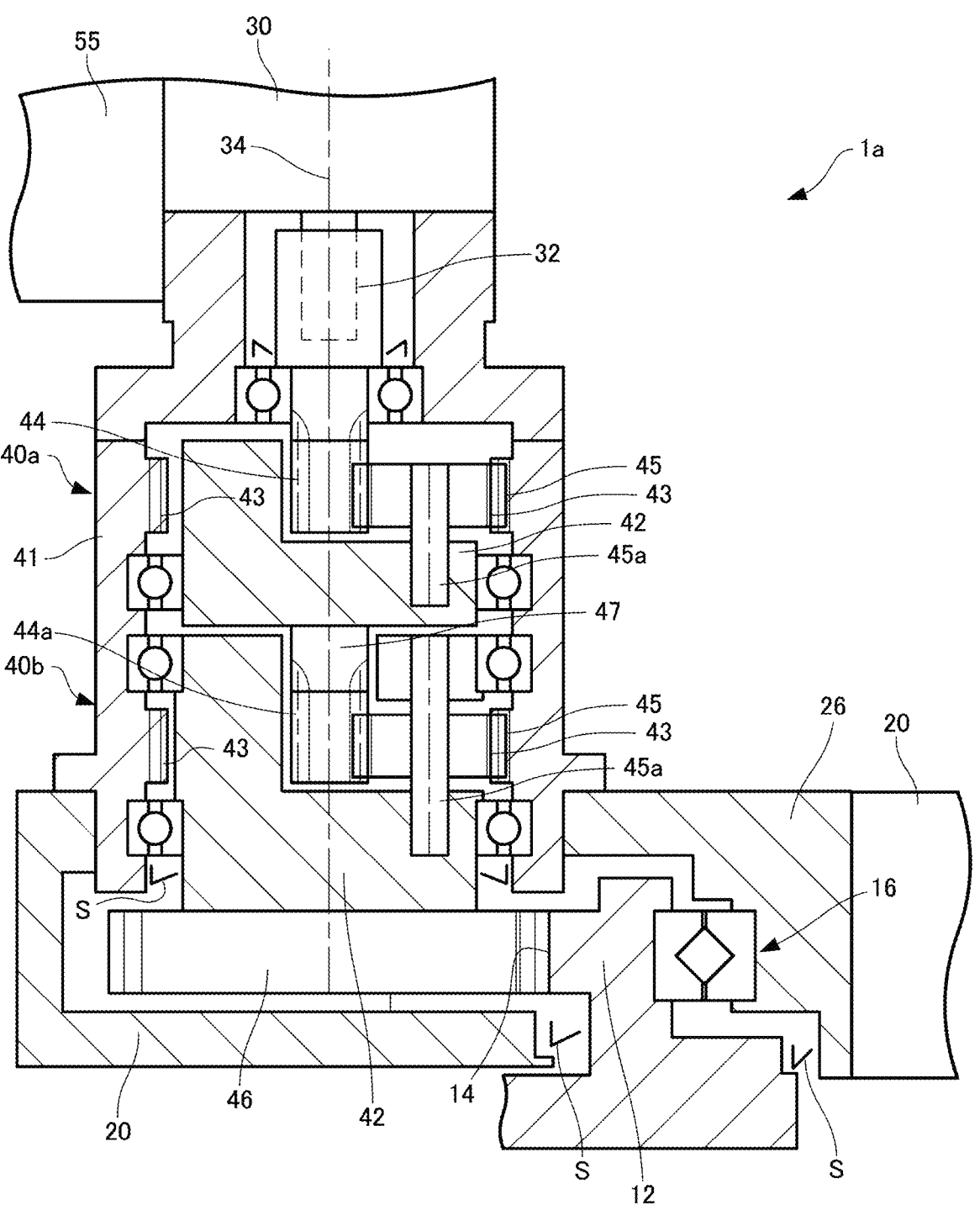
FIG. 5 is an enlarged view of a part of a longitudinal cross section of a conveyance device according to a variation.

As illustrated in FIG. 5 as a variation, speed reducers 40a and 40b may be connected to each other in multi-stage layout on the second rotation axis 34. FIG. 5 is an enlarged view of a part of a longitudinal cross section (a cross section corresponding to the A-A cross section in FIG. 2) of a conveyance device 1a according to the variation. The basic configuration is the same as that of the conveyance device 1, so a redundant description will be omitted. The conveyance device 1a has a configuration in which the speed reducer 40a is added between the sun gear 44 and the speed reducer 40b as compared with the conveyance device 1. The two speed reducers 40a and 40b are provided in the housing 41. In the speed reducer 40a on the servomotor 30 side, a plurality of planetary gears 45 are arranged around the sun gear 44 formed on the output shaft 32 of the servomotor 30, and the planetary gears 45 are rotatably supported by the planetary carrier 42. Each planetary gear 45 meshes with the sun gear 44 on the center side of the planetary carrier 42 and meshes with the internal gear 43 at a position protruding from the planetary carrier 42. The output shaft 47 protrudes from the lower surface of the planetary carrier 42 and rotates integrally with the planetary carrier 42. The output shaft 47 has substantially the same diameter as that of the output shaft 32, and a sun gear 44a is formed on the outer peripheral surface thereof. The basic configurations of the speed reducers 40a and 40b are the same as those of the speed reducer 40 in the embodiment.

A plurality of planetary gears 45 of the speed reducer 40b on the turning body 20 side mesh with the sun gear 44a. Therefore, in the conveyance device 1a, driving the servomotor 30 induces rotation of the output shaft 32 and the sun gear 44, rotation of the planetary gear 45 of the speed reducer 40*a*, and a rolling motion of each planetary gear 45 along the internal gear 43 to rotate the planetary carrier 42 relative to the housing 41. When the planetary carrier 42 rotates, the output shaft 47 rotates, and the output gear 46 of the speed reducer 40*b* rotates similarly to the above embodiment. Therefore, the output gear 46 rotates around the large gear 14 while rolling, and the turning body 20 supporting the planetary carrier 42 rotates around the first rotation axis 24 relative to the fixed base 10.

Connecting the plurality of speed reducers 40*a* and 40*b* to each other in a multi-stage layout in this manner helps achieve an increase in the speed reduction ratio. Therefore, for example, even if each servomotor 30 is an inexpensive and lightweight servomotor so that output torque is reduced, the output torque can be increased by a plurality of speed reducers 40*a* and 40*b*, so that the conveyance arm 50 can be turned at a high speed. Moreover, a plurality of speed reducers 40*a* and 40*b* are stacked along the second rotation axis 34 (in the direction perpendicular to the turning plane of the conveyance arm 50), which makes it possible to suppress an increase in distance between the first rotation axis 24 being the turning axis of the conveyance arm 50, and the position of the center of gravity of the servomotor 30. Therefore, an increase in moment of inertia of the turning body 20 including the speed reducer 40 is also suppressed, and acceleration and deceleration of the conveyance arm 50 can be increased. As a result, it is possible to suppress costs in continuously moving the conveyance arm 50 at a high speed in a reciprocating manner in a limited region (space) such as a space between press machines.

The present invention is not limited to the above-described embodiment, and various variations are possible, and the present invention includes substantially the same configuration (configuration having the same function, method, and result, or configuration having the same purpose and effect) as the configuration described in the embodiment. In addition, the present invention includes a configuration in which a non-essential part of the configuration described in the embodiment is replaced. In addition, the present invention includes a configuration that achieves the same operation and effect as the configuration described in the embodiment or a configuration that can achieve the same object. In addition, the present invention includes a configuration obtained by adding a known technique to the configuration described in the embodiment.

What is claimed is:

1. A conveyance device comprising:
a fixed base including a first gear serving as an external gear;
a turning body supported by the fixed base via a bearing;
two or more servomotors configured to rotate the turning body relative to the fixed base;
a conveyance arm configured to be able to convey a workpiece by turning in conjunction with the turning body; and
two or more speed reducers fixed to the turning body and respectively connected to the two or more servomotors, wherein:

the two or more servomotors are fixed to the turning body;
the conveyance arm is fixed to the turning body;
each of the speed reducers includes a housing integrated with the turning body, wherein the housing has a cylindrical shape that opens at its top and bottom, and has a lower end placed and fixed to the turning body, and the servomotor is placed on an upper end of the housing and fixed to the upper end, a planetary carrier rotatably supported inside the housing, an internal gear provided inside the housing, a sun gear connected to an output shaft of the servomotor, a plurality of planetary gears arranged around the sun gear and rotatably supported by the planetary carrier, and an output gear configured to rotate integrally with the planetary carrier;
the planetary gear meshes with the sun gear and with the internal gear; and
the output gear has a smaller diameter than a diameter of the first gear and meshes with the first gear outside the first gear.

2. The conveyance device according to claim 1, wherein:
a seal member is provided between an outer peripheral surface of the planetary carrier and an inner peripheral surface of the housing; and
lubricating oil is sealed in the housing by the seal member.

3. The conveyance device according to claim 1, wherein the workpiece is a metal plate for press working or a product after the press working.

4. The conveyance device according to claim 1, wherein:
the fixed base has an annular end portion having an annular shape and protruding from the fixed base;
the first gear having an annular shape is fixed to an outer peripheral surface of the annular end portion, and an outer ring of the bearing fixed to an inner peripheral surface of the annular end portion;
the turning body comprises an annular fixing portion having an annular shape and disposed along an inner side of the annular end portion;
an inner ring of the bearing is fixed to an outer peripheral surface of the annular fixing portion;
the fixed base and the turning body jointly have an opening formed inside the annular fixing portion along a rotation axis of the turning body; and
a wiring extends from the fixed base to the servomotor so as to pass through the opening.

5. The conveyance device according to claim 4, wherein:
the conveyance arm comprises a first arm and a first drive mechanism, the first arm having one end rotatably connected to the turning body; and
the first drive mechanism is configured to turn the first arm upwards and downwards so as to raise and lower the other end of the first arm.

6. The conveyance device according to claim 5, wherein the wiring passing through the opening comprises a power line connected to the first drive mechanism.

* * * * *